L. B. HARVEY.
AIR VALVE HAND HOLE PLATE FOR DISK WHEELS.
APPLICATION FILED MAR. 29, 1919.

1,338,177.

Patented Apr. 27, 1920.
2 SHEETS—SHEET 1.

INVENTOR
Louis B. Harvey
BY
ATTORNEY

L. B. HARVEY.
AIR VALVE HAND HOLE PLATE FOR DISK WHEELS.
APPLICATION FILED MAR. 29, 1919.
1,338,177.
Patented Apr. 27, 1920.
2 SHEETS—SHEET 2.
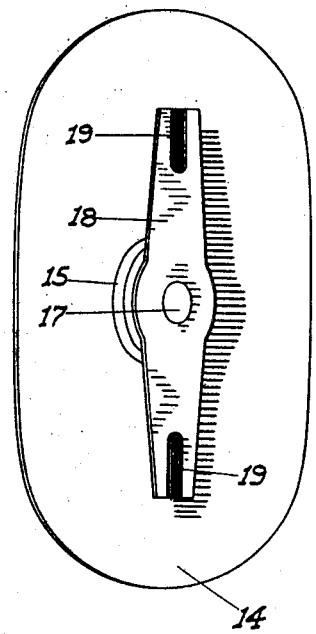
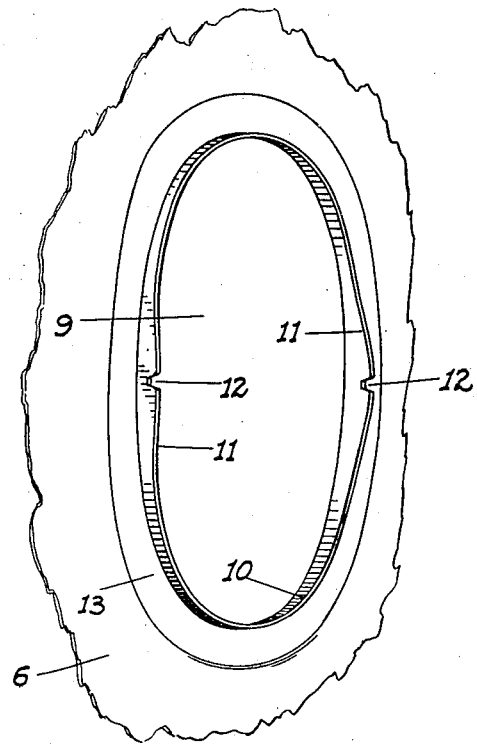
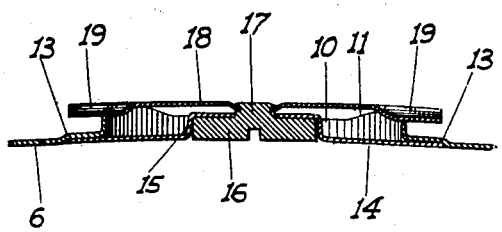
INVENTOR
Louis B. Harvey
BY
ATTORNEY

UNITED STATES PATENT OFFICE.

LOUIS B. HARVEY, OF BUFFALO, NEW YORK.

AIR-VALVE HAND-HOLE PLATE FOR DISK WHEELS.

1,338,177.  Specification of Letters Patent.  Patented Apr. 27, 1920.

Application filed March 29, 1919. Serial No. 286,133.

*To all whom it may concern:*

Be it known that I, LOUIS B. HARVEY, a citizen of the United States of America, residing at Buffalo, in the county of Erie and State of New York, have invented certain new and useful Improvements in Air-Valve Hand-Hole Plates for Disk Wheels; and I do declare the following to be a clear, full, and exact description of the same, reference being had to the accompanying drawings, and to the characters of reference marked thereon, which form a part of this application.

This invention relates to improvements in double disk-wheels used on motor vehicles having pneumatic tires, having particular reference to that type of wheel shown in my co-pending application for patent Serial Number 282,935, filed March 15, 1919.

In this type of wheel, which has solid face disks spaced apart substantially the width of the felly of the wheel, the air valve of the tire must necessarily extend through the felly between such disks.

The object of my invention is to provide the outer one of said disks with an orifice of suitable size adjacent the air valve, the orifice having an easily removed cover whereby the valve can be easily got at for pumping up the tire or for any other reason. The air valve is also protected from the possibility of any dirt and dust working therein and causing the same to leak.

A further object is to provide a simple and inexpensive device and yet one which will be exceedingly effective for the purposes for which it is designed.

These objects I accomplish by means of such structure and relative arrangement of the parts as will fully appear by a perusal of the following specification and claims.

On the drawings similar characters of reference indicate corresponding parts in the several views.

Fig. 2 is a perspective elevation of the hand plate, showing the fastening means on the inner face thereof.

Fig. 3 is a similar view showing the fastening receiving flange on the hand-hole of the disk.

Fig. 4 is a cross section through the disk and plate, showing the catch in locked position.

Figure 1:
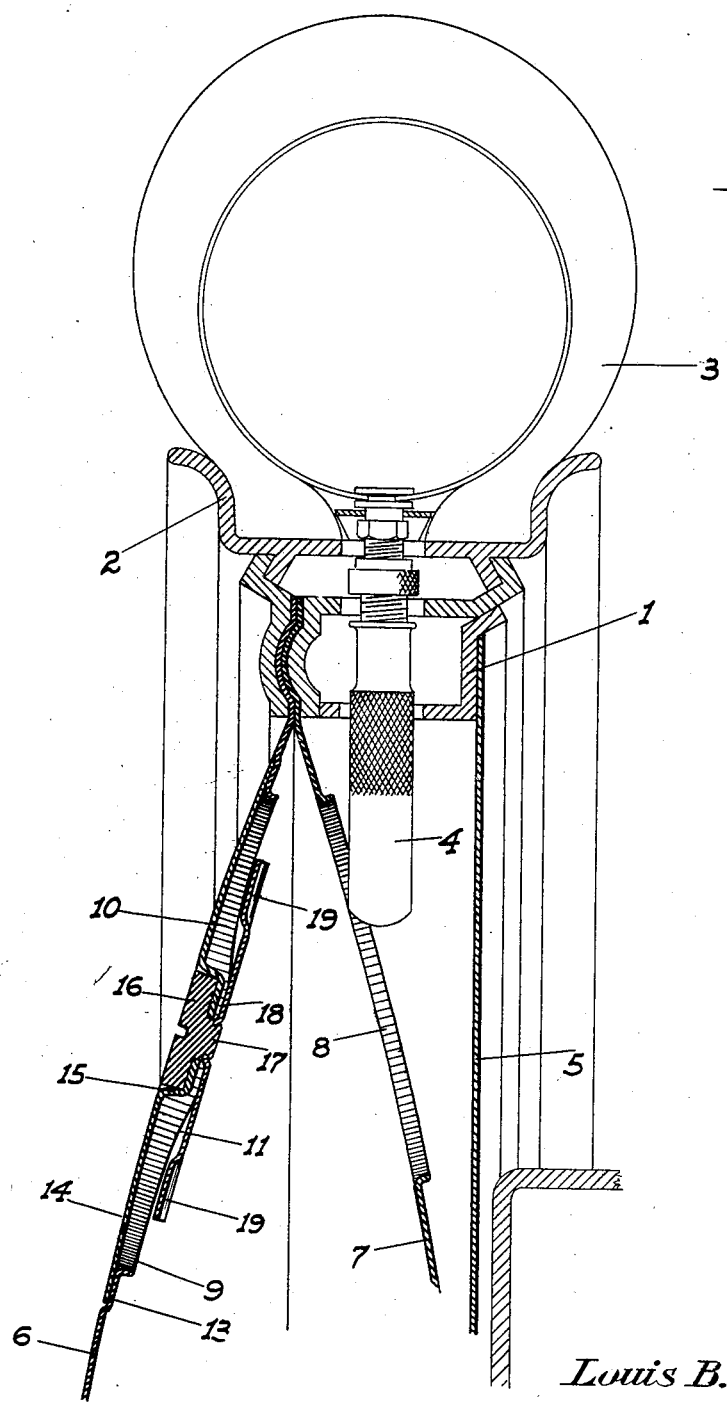
Figure 1 is a partial radial section through the wheel adjacent the air valve, showing my improved hand hole and plate thereon in unlocked position.

Referring now particularly to the characters of reference on the drawings, numeral 1 denotes the felly of the wheel having a rim 2 thereon on which is a pneumatic tire 3 having an air valve 4 projecting through the felly of the wheel in the usual manner.

Mounted to the felly in the manner specified in the aforementioned application for patent are inner and outer disks 5 and 6 respectively, with a diagonally placed disk 7 therebetween, which latter disk has a suitably sized orifice 8 therein adjacent the air valve 4. This disk is shown in said application for patent, but may be omitted without interfering in any way with the design and application of the present invention.

Substantially in alinement with the orifice 8 is an orifice 9 in the outer disk 6, substantially oval in cross section, and of a size sufficient to permit of the easy passage of a man's hand therethrough. The inner edges of this orifice are pressed inwardly to form a flange 10 therearound, this flange increasing gradually in height on each side as at 11 to a point in alinement with the lesser axis of the oval 1 at which point the flange is provided with diametrically opposed notches 12 for a purpose as will appear.

The outer face of the disk 6 around the orifice 9 is countersunk as at 13 to form a seat for a hand plate 14. This plate is cupped centrally as at 15 to form a seat for the slotted head of a pin 17, the pin projecting through the plate 14 and being secured on its inner end to a spring bar 18 adapted to turn with the head 16 and being provided with a V-shaped lug 19 on each end facing toward the flange 10 and being adapted to seat in the notches 12 thereon.

The member 18 is shorter than the greatest diameter of the orifice 9, but longer than the smallest diameter thereof, and the lugs 19 are normally adapted to ride on the flange 10 without the tension of the spring thereof coming into play, but when the head 16 is turned to cause the member 18 to climb the slope 11 of the flange 10, the angle of said slope causes the member 18 to bend at its ends until the lugs 19 snap into place in the notches 12, thus securely locking the plate 18 in position, the bottom of the notch being farther away from the disk 6 than the edge of the flange 10.

The sides of the notches 12 are of an angle sufficient to permit the lugs 19 to rise out of the notches 12 when it is desired to remove the plate by turning the head 16.

From the foregoing description it will readily be seen that I have produced such a device as substantially fulfils the objects of the invention, as set forth herein.

While this specification sets forth in detail the present and preferred construction of the device, still in practice, such deviations from such detail may be resorted to as do not form a departure from the spirit of the invention, as defined by the appended claims.

Having thus described my invention, what I claim as new and useful and desire to secure by Letters Patent is:—

1. In combination with a disk wheel carrying a pneumatic tire having the air valve thereof projecting adjacent the disk, the disk being provided with a hand hole adjacent the air valve, a removable hand plate over the hand hole, a spring bar on the inner face of the plate, means secured to the bar centrally thereof and projecting through the plate whereby the same may be turned from the outside of the plate, V-shaped lugs on the bar projecting toward the plate, and a flange on the inner face of the disk surrounding the orifice provided with diametrical V-shaped notches adapted to receive the lugs on the bar therein, the orifice being substantially oval, the notches in the surrounding flange being at the minor axis thereof and the spring bar being adapted to pass through the orifice at its point of greatest diameter and to bear on the flange when such bar is turned.

2. In a disk wheel adapted to carry a pneumatic tire thereon, an oval hand hole provided in the disk, the same being countersunk around the hole, a hand plate adapted to removably seat in the countersunk portion, a spring bar on the inner face of the plate turnable centrally from the outside thereof and of greater length than the minor axis of the hole, and tapered flanges projecting inwardly from the edges of the hole having their greatest height at the minor axis thereof and provided with opposed incisions at those points adapted to receive the ends of the spring bar therein.

3. In a disk wheel, a hand hole provided in the disk, a hand plate adapted to cover said hole and a spring bar on the inner face of the plate turnable from the outside thereof and adapted to engage the disk when turned.

4. In a disk wheel, an oval hole provided in the disk, a hand plate adapted to cover said hole, and a spring bar on the inner face of the plate adapted to engage the inner surface of the disk adjacent the minor axis of the hole, said bar being of greater length than said minor axis and being turnable centrally from the outside of the plate.

5. In a disk wheel, an oval hole provided in the disk, a hand plate adapted to cover said hole, a spring bar on the inner face of the plate turnable centrally from the outside of the plate and being of greater length than the minor axis of the hole, and means for holding the bar in locked engagement with the disk adjacent said minor axis.

6. In a disk wheel, a hand hole provided in the disk, a hand plate covering the hole and lying flush with the outer surface of the disk, and a spring bar on the inner face of the plate and turnable from the outside thereof and adapted to engage the disk when turned.

In testimony whereof I affix my signature in presence of two witnesses.

LOUIS B. HARVEY.

Witnesses:
 FRANK H. CARTER,
 BERNARD PRIVAT.